(12) United States Patent
Lo

(10) Patent No.: US 10,379,594 B2
(45) Date of Patent: Aug. 13, 2019

(54) SLEEP-MODE DETECTION METHOD THEREOF

(71) Applicant: Silicon Motion, Inc., Jhubei (TW)

(72) Inventor: Chun-Yi Lo, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 447 days.

(21) Appl. No.: 14/552,063

(22) Filed: Nov. 24, 2014

(65) Prior Publication Data

US 2015/0160713 A1 Jun. 11, 2015

(30) Foreign Application Priority Data

Dec. 9, 2013 (TW) .............................. 102145063 A

(51) Int. Cl.
*G06F 1/3234* (2019.01)

(52) U.S. Cl.
CPC ............ *G06F 1/3275* (2013.01); *Y02D 10/14* (2018.01); *Y02D 50/20* (2018.01)

(58) Field of Classification Search
None
See application file for complete search history.

(56) References Cited

U.S. PATENT DOCUMENTS

| 7,328,356 B2* | 2/2008 | Igari ..................... G06F 1/3228 |
| | | 713/320 |
| 8,819,462 B2* | 8/2014 | Cheong ................ G06F 1/3256 |
| | | 713/300 |
| 2012/0226927 A1 | 9/2012 | Kagan | |
| 2013/0046502 A1* | 2/2013 | Zhang .................... G06F 11/25 |
| | | 702/117 |
| 2013/0185299 A1 | 7/2013 | Landry | |
| 2013/0198423 A1* | 8/2013 | Sarkar .................. G06F 13/385 |
| | | 710/74 |
| 2014/0089693 A1* | 3/2014 | Ooi ....................... G06F 1/3206 |
| | | 713/320 |

(Continued)

FOREIGN PATENT DOCUMENTS

| CN | 1831784 A | 9/2006 |
| TW | 201214106 A1 | 4/2012 |
| TW | 201310222 A1 | 3/2013 |

OTHER PUBLICATIONS

Intel Corporation, SanDisk Corpration. Serial ATA Device Sleep (DevSleep) and Runtine D3 (RTD3) (A Whitepaper). Dec. 2011. https://www.sata-io.org/sites/default/files/documents/SATADevSleep-and-RTD3-WP-037-20120102-2 _final. pdf accessed on Mar. 24, 2017.*

(Continued)

*Primary Examiner* — Kim Huynh
*Assistant Examiner* — Joshua Neveln
(74) *Attorney, Agent, or Firm* — Wang Law Firm, Inc.

(57) ABSTRACT

A detection method applied to a storage device including transmitting a Devslp command to a signal pin of the storage device; pulling high the voltage level at a control pin of the storage device when a first response corresponding to the Devslp command is received to enable the storage device to enter a sleep mode; pulling low the voltage level at the control pin when a first predetermined period has elapsed; transmitting a Comwake signal to the signal pin; and determining that the sleep mode of the device under test meets a specification when the storage device receives a second response corresponding to the Comwake signal in a second predetermined period.

14 Claims, 4 Drawing Sheets

(56) References Cited

U.S. PATENT DOCUMENTS

2014/0281600 A1* 9/2014 Wells .................... G06F 1/3275
                                                                  713/320

OTHER PUBLICATIONS

Office Action of corresponding CN application, published on Nov. 30, 2016.
Office Action of corresponding TW application, published on Jun. 18, 2015.
Notice of Allowance of corresponding CN application, published on Jun. 29, 2017.

* cited by examiner

SLEEP-MODE DETECTION METHOD THEREOF

CROSS REFERENCE TO RELATED APPLICATIONS

This Application claims priority of Taiwan Patent Application No. 102145063, filed on Dec. 9, 2013, the entirety of which is incorporated by reference herein.

BACKGROUND OF THE INVENTION

Field of the Invention

The present disclosure is related to a sleep-mode detection method, and in particular to a sleep-mode detection method applied to an electronic device for detecting a device under test.

Description of the Related Art

As technology advances, more and more digital devices are being designed and produced, such as flash drives, external CD-ROM drives, external hard disks, digital cameras, mobile phones, etc. These digital devices typically have a port for connecting to the host device. The host device can access data on digital devices when the ports of the host computer and the digital device are coupled.

Some digital devices have different specifications of sleep mode in order to reduce the power consumption of the host device. However, the user needs an expensive analyzer to detect whether the sleep mode of the digital device meets specifications. Therefore, the detection of the sleep mode is inconvenient.

BRIEF SUMMARY OF THE INVENTION

A detailed description is given in the following embodiments with reference to the accompanying drawings.

The present invention provides a sleep-mode detection method including transmitting a Devslp command to at least one signal pin of a second transmitting port of a device under test by a first transmitting port, wherein the first transmitting port is compatible with a first interface standard, and the second transmitting port is compatible with a second interface; pulling high voltage level at a control pin of the second transmitting port by a third transmitting port compatible with a third interface when the first transmitting port receives a first response corresponding to the Devslp command from the device under test to enable the device under test to enter a sleep mode, wherein the third interface is different from the first interface and the second interface, and the third transmitting port is arranged to be coupled to the control pin of the second transmitting port; pulling low the voltage level at the control pin and transmitting a Comwake signal to the signal pin by the third transmitting port after the voltage level at the control pin is pulling high a first predetermined period to enable the device under test to enter a normal operating mode from the sleep mode; determining whether the first transmitting port receives a second response corresponding to the Comwake signal from the device under test in a second predetermined period; and determining that the sleep mode of the device under test meets a specification and outputting a result indicating that the sleep mode meets the specification when the first transmitting port receives the second response in the second predetermined period.

The present invention further provides a detection method applied to a storage device including transmitting a Devslp command to a signal pin of the storage device; pulling high voltage level at a control pin of the storage device when a first response corresponding to the Devslp command is received to enable the storage device to enter a sleep mode; pulling low the voltage level at the control pin when a first predetermined period has elapsed; transmitting a Comwake signal to the signal pin; and determining that the sleep mode of the device under test meets a specification when the storage device receives a second response corresponding to the Comwake signal in a second predetermined period.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
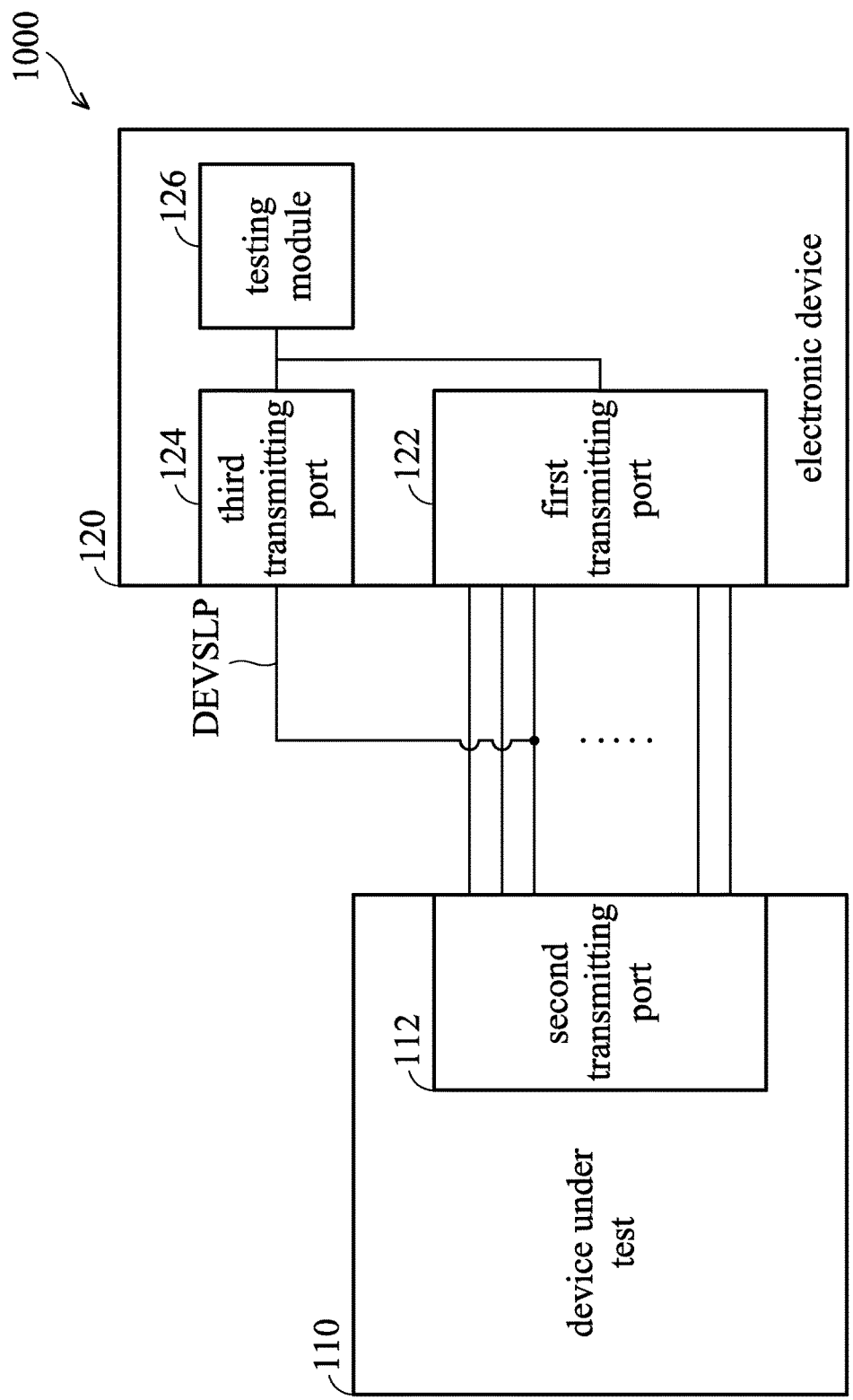
FIG. 1 is a schematic diagram illustrating an embodiment of a detection system of the present disclosure.

FIG. 1 is a schematic diagram illustrating an embodiment of a detection system of the present disclosure. The detection system 1000 includes a device under test 110 and an electronic device 120. The device under test 110 is coupled to the electronic device 120. The electronic device 120 is arranged to detect whether a sleep mode of the device under test 110 is normal.

The device under test 110 includes a second transmitting port 112 compatible with a second interface. The second transmitting port 112 can be connected to the electronic device 120 or another consumer electronic device for transmitting data to the connected electronic device 120 or the connect consumer electronic device. In one embodiment, the device under test 110 can be a solid state disk, and the second interface is a SATA interface arranged to access the memory of the solid state disk, but it is not limited thereto. For example, the device under test 110 can be another device having the second interface. Moreover, the device under test 110 can operate in a sleep mode and a normal operating mode. For example, the sleep mode can be the DEVSLP mode defined in the specification of the Serial ATA, but it is not limited thereto. The DEVSLP mode is the most power conserving mode of the SATA specification. The physical layer and the other electronic circuits of the device under test 110 are powered-off in the DEVSLP mode. The physical layer and the other electronic circuits of the device under test 110 are powered-on in other low power modes, i.e. Partial mode and Slumber mode. It should be noted that, in the Serial ATA specification, the device under test 110 has to return to the normal operating mode in 20 Milliseconds from the DEVSLP mode.

The electronic device 120 includes a first transmitting port 122, a third transmitting port 124 and a testing module 126.

Moreover, those skilled in the art will understand that the electronic device 120 may be practiced with other computer-system configurations, including handheld devices, portable devices, desktop computers, test machines, microprocessor-based or programmable consumer electronics, network PCs, minicomputers, mainframe computers, and the like. The electronic device 120 is arranged to detect whether the sleep mode of the device under test 110 is normal. The third transmitting port 124 is compatible with the third interface and arranged to be coupled to a control pin DEVSLP of the second transmitting port 112 of the device under test 110. The first transmitting port 122 is compatible with the first interface and arranged to be coupled to all pins except for the control pin DEVSLP of the second transmitting port 112 of the device under test 110, wherein the control pin DEVSLP includes at least one other signal pin. In one embodiment, the first interface and the second interface are the same, and the third interface is different from the first interface and the second interface, but it is not limited thereto. For example, the first interface and the second interface is the SATA interface. Namely, the first transmitting port 122 and the second transmitting port 112 are the transmission ports having a plurality of pins defined by the SATA interface. It should be noted that the SATA interface includes a power pin set and a signal pin set, the control pin DEVSLP is included in the power pin set, and the signal pin is included in the signal pin set. For example, the signal pin set of the SATA interface includes two pairs of differential signal pins. The third interface can be a USB interface, a 3.5 mm audio interface or a Parallel Printer interface, but it is not limited thereto.

It should be noted that, in one embodiment, the device under test 110 may be coupled to the electronic device 120 by an adapter board (not shown). For example, the adapter board may include the third transmitting port compatible with the second interface for connecting with the second transmitting port 112, a fourth transmitting port compatible with the first interface for connecting with the first transmitting port 122, and a fifth transmitting port compatible with the third interface for connecting with the third transmitting port 124. The adapter board may be arranged to couple the control pin DEVSLP of the second transmitting port 112 and the third transmitting port 124 using the control pin DEVSLP by the fifth transmitting port, such that the control pin DEVSLP of the second transmitting port 112 may be coupled to the third transmitting port 124 of the electronic device 120 through the fifth transmitting port of the adapter board, wherein the fifth transmitting port is compatible with the third interface. Moreover, the adapter board may receive data from the second transmitting port 112 by the fifth transmitting port compatible with the third interface and transmit the received data of the second transmitting port 112 to the third transmitting port 124 of the electronic device 120, but it is not limited thereto.

The testing module 126 includes a central-processing unit (CPU) or a plurality of parallel processing units in a parallel processing environment. The memory of the testing module 126 may include at least one read only memory, at least one flash ROM and/or at least one random access memory (RAM). The memory is arranged to store the program code executed by the testing module 126. The program code may include routines, a program, an object, a component and/or Web Service, etc. In this embodiment, the testing module 126 is arranged to execute the sleep-mode detection method as shown in FIG. 2A-2B.

Figure 2A:
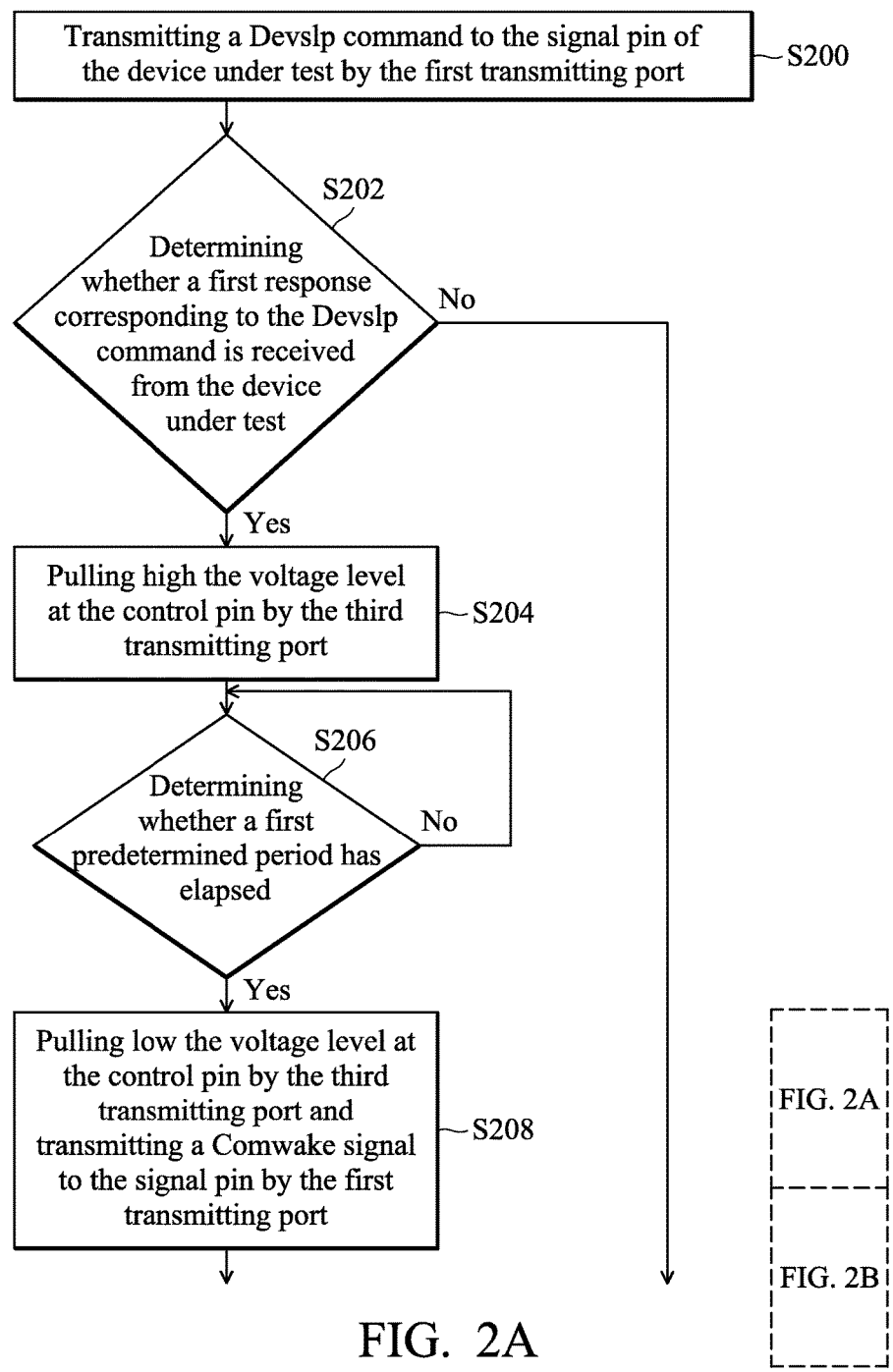
FIG. 2A-2B is a flowchart of a sleep-mode detection method according to an embodiment of the present disclosure.
Figure 2B:
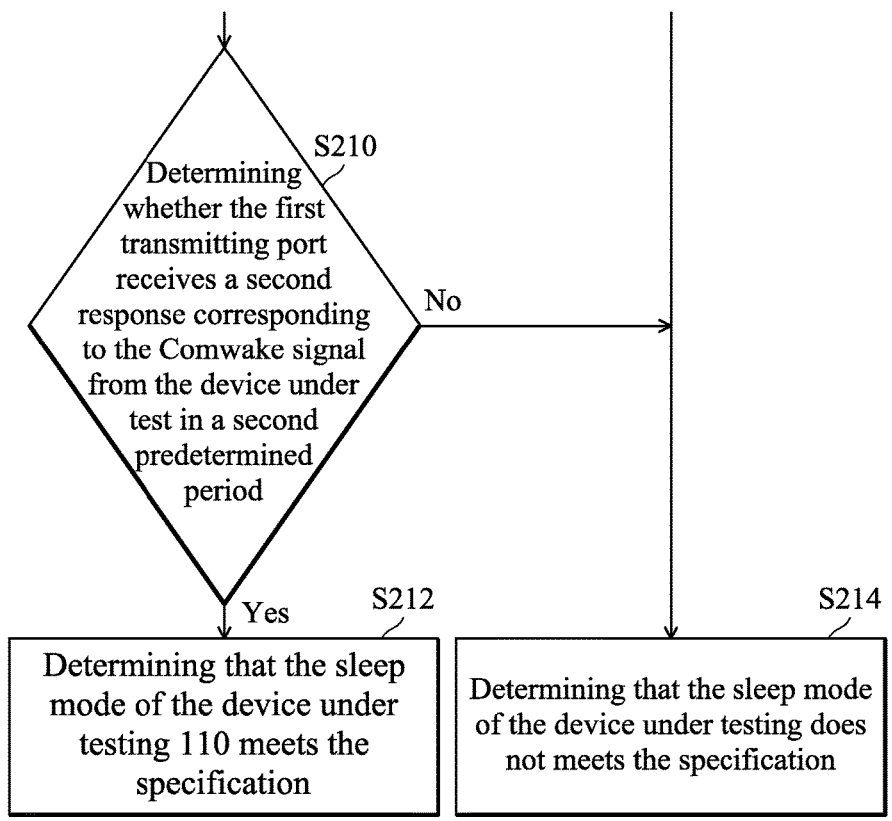

FIG. 2A-2B is a flowchart of a sleep-mode detection method according to an embodiment of the present disclosure, wherein the sleep-mode detection method is applied to the detection system 1000 of FIG. 1. The process starts at step S200.

In step S200, the testing module 126 transmits a Devslp command to at least one signal pin of the second transmitting port 112 of the device under test 110 by the first transmitting port 122, wherein the first transmitting port 122 is compatible with a first interface, and the second transmitting port 112 is compatible with a second interface.

In step S202, the testing module 126 determines whether the first transmitting port 122 receives a first response corresponding to the Devslp command from the device under test 110, wherein the first response indicates that the device under test 110 successfully has received and read the Devslp command transmitted by the testing module 126. For example, in one embodiment, the first response may be 50, but it is not limited thereto. when the first transmitting port 122 receives the first response corresponding to the Devslp command from the device under test 110, the process goes to step S204. When the first transmitting port 122 has not received the first response corresponding to the Devslp command from the device under test 110, the process goes to step S214.

In step S204, the testing module 126 pulls high the voltage level at the control pin DEVSLP of the second transmitting port 112 by the third transmitting port 124 compatible with the third interface to enable the device under test 110 to enter a sleep mode, wherein the third interface is different from the first interface and the second interface, and the third transmitting port 124 is arranged to be coupled to the control pin DEVSLP of the second transmitting port 112.

Next, in step S206, the testing module 126 determines whether a first predetermined period has elapsed since the voltage level of the control pin DEVSLP is pulled high. When the first predetermined period has elapsed, the process goes to step S208, otherwise, the testing module 126 continuous to determine whether a first predetermined period has elapsed since the voltage level of the control pin DEVSLP is pulled high. In one embodiment, the first predetermined period is 10 milliseconds (ms), but it is not limited thereto. The first predetermined period can be a time consisting of a rational number between zero to ten seconds.

In step S208, the testing module 126 pulls low the voltage level at the control pin DEVSLP by the third transmitting port 124, and transmits a Comwake signal to the signal pin by the first transmitting port 122 for enabling the device under test 110 to return to the normal operating mode from the sleep mode.

Next, in step S210, the testing module 126 determines whether the first transmitting port 122 receives a second response corresponding to the Comwake signal from the device under test 110 in a second predetermined period, wherein the second response indicates that the device under test 110 has returned to the normal operating mode from the sleep mode. It should be noted that, in one of the embodiments, the second predetermined period is 20 milliseconds (ms) when the sleep mode is the DEVSLP mode defined by the Serial ATA specification, but it is not limited thereto. The sleep mode of the embodiments may also be defined by other specifications, and the second predetermined period is the time limitation defined by the corresponding specification, wherein the period that the device has to return to the normal operating mode from the sleep mode is the second predetermined period. When the first transmitting port 122 receives the Comwake signal corresponding to the second response from the device under test 110 in the second predetermined period, the process goes to step S212, otherwise, the process goes to step S214.

For example, the first interface and the second interface are the SATA interface. Namely, the first transmitting port 122 and the second transmitting port 112 are the SATA transmitting ports including a plurality of pins compatible with the SATA interface. The third interface may be a USB interface, a 3.5 mm audio interface or a Parallel Printer interface, but it is not limited thereto. It should be noted that the SATA interface includes a power pin set and a signal pin set, the control pin DEVSLP is included in the pins of the power pin set, and the signal pin is at least one of the pins of the signal pin set. For example, the signal pin set of the SATA interface includes two pairs of differential signal pins. Therefore, the Devslp command, the Comwake signal, the first response and the second response are transmitted by one of the two pairs of differential signal pins of the SATA interface of the first transmitting port 122 and the second transmitting port 112, but it is not limited thereto. In other embodiments, the control pin DEVSLP may also be included in the signal pin set. For example, the control pin DEVSLP is the pin arranged to control the device under test 110 to enter/exit the sleep mode when the second interface is the SATA interface or other interfaces.

In step S212, the testing module 126 determines that the sleep mode of the device under test 110 meets the specification, and produces a result indicating that the sleep mode meets the specification, wherein the result is arranged to be displayed on a screen or written into a file. The process ends at step S212.

In step S214, the testing module 126 determines that the sleep mode of the device under test 110 does not meets the specification, and produces a result indicating the sleep mode does not meeting the specification, wherein the result is arranged to be displayed on a screen or written into a file. The process ends at step S214.

The detection system 1000 and the sleep-mode detection method of the embodiments can determine whether the sleep mode meets a specification.

Figure 3:
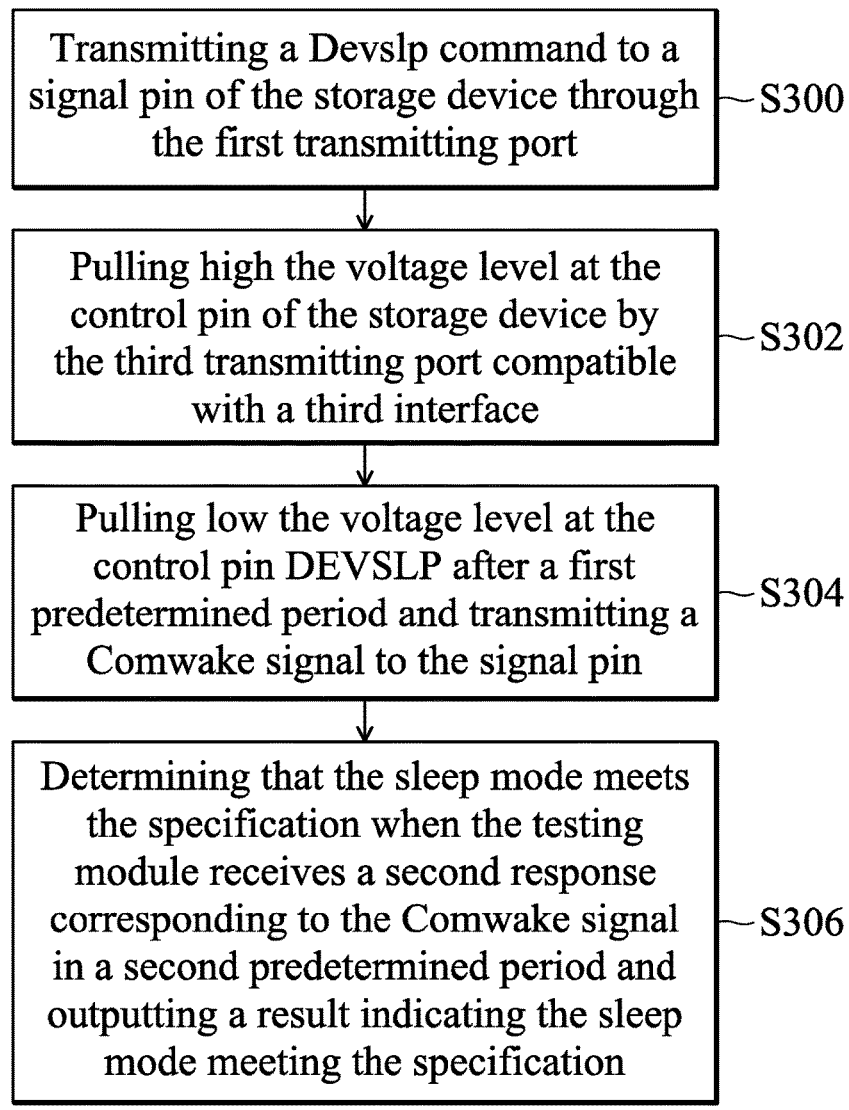
FIG. 3 is a flowchart of a detection method applied to a storage device according to another embodiment of the present disclosure.

FIG. 3 is a flowchart of a detection method applied to a storage device according to another embodiment of the present disclosure. The detection method is applied to the detection system 1000 of FIG. 1. It should be noted that, in this embodiment, the device under test 110 is a storage device. The process starts at step S300.

In step S300, the testing module 126 transmits a Devslp command to a signal pin of the storage device through the first transmitting port 122. It should be noted that, in this embodiment, the signal pin is the R+ pin or the R− pin of the Serial ATA specification.

Next, in step S302, the testing module 126 pulls high the voltage level at the control pin DEVSLP of the storage device by the third transmitting port 124 compatible with the third interface to enable the storage device to enter a sleep mode when the first transmitting port 122 of the testing module 126 receives the first response corresponding to the Devslp command from the device under test 110. It should be noted that, in this embodiment, the control pin is the DEVSLP pin of the Serial ATA specification.

Next, in step S304, the testing module 126 pulls low the voltage level at the control pin DEVSLP by the third transmitting port 124 after a first predetermined period since the voltage level at the control pin DEVSLP is pulled high, and transmits a Comwake signal to the signal pin through the first transmitting port 122 to enable the device under test 110 to return to the normal operating mode from the sleep mode.

Next, in step S306, the testing module 126 determines that the sleep mode of the device under test meets the specification when the first transmitting port 122 of the testing module 126 receives a second response corresponding to the Comwake signal from the device under test 110 in a second predetermined period, and output a result indicating the sleep mode meeting the specification. It should be noted that, in this embodiment, the testing module 126 determines that the sleep mode of the device under test does not meets the specification and outputs a result indicating the sleep mode does not meeting the specification when the first transmitting port 122 of the testing module 126 does not receives the first response corresponding to the Devslp command from the device under test 110 or when the first transmitting port 122 of the testing module 126 does not receives a second response corresponding to the Comwake signal from the device under test 110 in a second predetermined period, but it is not limited thereto.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sleep-mode detection method, comprising:
transmitting, using a testing module, a Devslp command to at least one signal pin of a second transmitting port of a device under test by a first transmitting port, wherein the first transmitting port is compatible with a first interface standard, and the second transmitting port is compatible with a second interface;
pulling high, using the testing module, voltage level at a control pin of the second transmitting port by a third transmitting port compatible with a third interface when the first transmitting port receives a first response corresponding to the Devslp command from the device under test to enable the device under test to enter a sleep mode, wherein the third interface is different from the first interface and the second interface, and the third transmitting port is arranged to be coupled to the control pin of the second transmitting port;
pulling low, using the testing module, the voltage level at the control pin and transmitting a Comwake signal to the signal pin by the third transmitting port after the voltage level at the control pin is pulling high a first predetermined period to enable the device under test to enter a normal operating mode from the sleep mode;

determining, using the testing module, whether the first transmitting port receives a second response corresponding to the Comwake signal from the device under test in a second predetermined period; and determining, using the testing module, that the sleep mode of the device under test meets a specification and outputting a result indicating the sleep mode that meets the specification when the first transmitting port receives the second response in the second predetermined period.

2. The sleep-mode detection method as claimed in claim 1, wherein the device under test is a Solid State Disk.

3. The sleep-mode detection method as claimed in claim 2, wherein the sleep mode is the DEVSLP defined in the Serial ATA standard.

4. The sleep-mode detection method as claimed in claim 3, wherein the second predetermined period is 20 milliseconds.

5. The sleep-mode detection method as claimed in claim 3, wherein the second interface is a SATA interface.

6. The sleep-mode detection method as claimed in claim 5, wherein the first interface is the same as the second interface.

7. The sleep-mode detection method as claimed in claim 5, wherein the SATA interface comprises a power pin set and a signal pin set, the control pin is included in the power pin set, and the signal pin is included in the signal pin set.

8. The sleep-mode detection method as claimed in claim 1, further comprising:

determining whether the first transmitting port receives the first response corresponding the Devslp command from the device under test; and determining that the sleep mode of the device under test does not meet the specification when the first transmitting port does not receive the first response corresponding the Devslp command from the device under test.

9. The sleep-mode detection method as claimed in claim 1, further comprising determining that the sleep mode of the device under test does not meet the specification when the first transmitting port does not receive the second response in the second predetermined period.

10. The sleep-mode detection method as claimed in claim 1, wherein the first transmitting port, the second transmitting port and the testing module are disposed in the same electronic device.

11. A detection method applied to a storage device, comprising:

transmitting, using a testing module, a Devslp command to a signal pin of the storage device;

pulling high, using the testing module, voltage level at a control pin of the storage device when a first response corresponding to the Devslp command is received to enable the storage device to enter a sleep mode;

pulling low, using the testing module, the voltage level at the control pin when a first predetermined period has elapsed;

transmitting, using the testing module, a Comwake signal to the signal pin to enable the storage device to enter a normal operating mode from the sleep mode; and determining, using the testing module, that the sleep mode of the device under test meets a specification when the storage device receives a second response corresponding to the Comwake signal in a second predetermined period; wherein the Devslp command and the Comwake signal are outputted from a first transmitting port of an electronic device, the voltage level at the control pin of the storage device is pulled high or low by a second transmitting port of the electronic device, and the testing module is disposed in the electronic device.

12. The detection method as claimed in claim 11, wherein the signal pin is an R+ pin or R− pin defined in Serial ATA specification.

13. The detection method as claimed in claim 11, wherein the control pin is the DEVSLP pin defined in Serial ATA specification.

14. The detection method as claimed in claim 11, further comprising outputting a result indicating that the sleep mode meets the specification.

* * * * *